United States Patent Office 3,076,821
Patented Feb. 5, 1963

3,076,821
(1-AMINO-2-ANTHRAQUINONYL CARBONYLAMI-
NO)-ALKYL-QUATERNARY AMMONIUM SALTS)
Robert C. Hoare, Hamburg, N.Y., assignor to Allied
Chemical Corporation, New York, N.Y., a corporation
of New York
No Drawing. Filed Nov. 8, 1960, Ser. No. 67,935
2 Claims. (Cl. 260—377)

This invention relates to anthraquinone dyes, and more particularly to quaternary ammonium derivatives of amino-anthraquinones useful for dyeing polyacrylonitrile fibers including yarns and textiles containing such fibers.

Since the introduction into commerce of polymers and copolymers of acrylonitrile (hereinafter, for the sake of brevity, referred to as acrylic fibers), much research effort has been devoted to the development of dyes for the dyeing of such fibers including yarns and textiles containing them alone or in admixture with other fibers. Various quaternized amino-anthraquinone derivatives have been proposed for this purpose.

It is among the objects of the present invention to provide novel amino-anthraquinone dyestuffs for coloring acrylic fibers, including yarns and textiles containing such fibers alone or admixed with other fibers, which dyestuffs produce colors or shades which are both wash- and light-fast on acrylic fibers.

Other objects and advantages of the dyestuffs of the invention will be apparent from the following detailed description thereof.

The dyestuffs of this invention are cationic anthraquinone dyes having the formula:

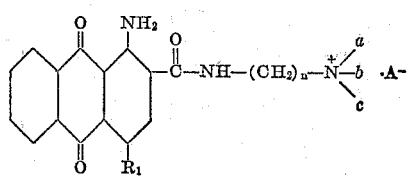

in which $n$ is an integer of from 2 to 4; $a$ and $b$ are each alkyl, aralkyl, hydroxyalkyl or aryl, or are parts of a heterocyclic ring which contains the quaternary ammonium nitrogen atom; $c$ is alkyl, aralkyl, hydroxyalkyl or aryl; A is an anion; $R_1$ is hydrogen, hydroxyl, alkylamino, arylamino or cycloalkylamino.

The $a$, $b$ and $c$ substituents, when alkyl or hydroxyalkyl, preferably contain from 1 to 4 carbon atoms, and when aryl, are phenyl or naphthyl. The heterocyclic group, of which $a$ and $b$ may be parts, is a morpholino-, piperidino-, pyrrolidino-, or piperazino-radical.

The $R_1$ substituent, when alkylamino, is methylamino, t-butylamino, laurylamino, hydroxyethylamino, ethoxyethylamino, or hydroxyethoxypropylamino; desirably the alkyl group is lower alkyl containing, for example, from 1 to 4 carbon atoms.

The $R_1$ substituent, when arylamino, is anilino, α-naphthylamino, tolylamino or 4-nitrophenylamino.

The $R_1$ substituent, when cycloalkylamino, is methylcyclopentylamino, cyclohexylamino, methylcyclohexylamino or cyclophentylamino.

The cationic anthraquinone dyes of the present invention are obtained by condensing a 1-amino-anthraquinone-2-carbonyl derivative corresponding to the desired dye and having a replaceable substituent on the carbonyl group such, for example, as a halogen, with a suitable alkylene diamine, such as a dialkylaminoalkylamine, the alkyl groups each having from 2 to 4 carbon atoms, and reacting the resulting product with a quaternizing agent such as dimethyl sulfate to form the cationic dye.

The quaternizing agent may be characterized by the formula $R_2A$, in which $R_2$ is the quaternizing group, and A is the anion which may contain an organic residue (e.g., $CH_3 SO_4^-$ in dimethyl sulfate). Quaternizing agents which may be used instead of dimethyl sulfate include other lower dialkyl sulfates such as diethyl, dipropyl or dibutyl sulfate; lower alkyl halides such as methyl (ethyl or butyl iodide, methyl or ethyl chloride, propyl, butyl or hexyl bromide; aralkylhalides such as benzyl chloride; lower alkyl esters of organic sulfonic acids such as methyl, ethyl, propyl or butyl toluene sulfonates; or substituted alkyl halides such as ethylene or propylene chlorohydrin.

The quaternization reaction is performed in the presence of a solvent in which the dye base is soluble and which is relatively unreactive toward the quaternizing agent. Among the solvents that can be employed in this reaction are normal and tertiary butanol, mono- and trichlorobenzene, the xylenes and benzene. The volume of the solvent is not critical. The solvent functions to provide a fluid reaction mass and the amounts can be varied considerably. The use of large quantities of solvent is objectionable, however, because it is wasteful and expensive.

Inasmuch as the quaternization occurs at ambient or slightly elevated temperatures, it is preferred to carry out this step at moderate temperatures, i.e., at temperatures below 65° C. Higher temperatures can be used, although in the presence of primary and secondary amino groups, reaction of the quaternizing agent with these substituents of the anthraquinone compound when present, should be avoided.

The dyeing of acrylic fibers with cationic dyes involves a simple ion exchange phenomenon in which the cation from the dyestuc replaces the anion contributed by the polyacrylonitrile residue. Hence, it is evident that the dyestuff anion serves merely to assist in the solubilization of the dyestuff in the dye bath. Accordingly, other anions besides those included in the preceding list of quaternizing agents may be associated with the cationic dyestuff as long as the dyestuff is not thereby insolubilized in the dye bath. The anion can be varied considerably without materially affecting the application and coloration properties of the dyestuffs.

The dyeing of textiles or yarns containing acrylic fibers with the dyestuffs of this invention is carried out from aqueous dye baths, the pH of which is preferably slightly acid, i.e., about pH 4.5 or 5.5, although pH ranges of 3 to about 10 can be used. The most favorable conditions for any of the dyestuffs coming within the scope of the invention can readily be ascertained by a few trial experiments.

The following examples are given for illustrative purposes. It will be understood that this invention is not limited to these examples. In the examples, all parts are on a weight basis and the temperatures are given in ° C.

EXAMPLE I

A mixture of 50 parts of 1-amino-anthraquinone-2-carbonyl chloride, 100 parts of N,N-dimethylamino-1,3-propanediamine and 200 parts of water was heated to 95°. After the addition of about 40 parts of secondary butyl alcohol, the mixture was heated under reflux for about 16 hours. The mixture was cooled to 30°, filtered, washed with cold water and dried at 60°.

The dried dye base was slurried in about 400 parts of chlorobenzene, and 26.6 parts of dimethyl sulfate were added drop-wise. The mixture was agitated for about 16 hours, filtered, washed with chlorobenzene and dried. The dried product amounting to 44.4 parts and having the formula:

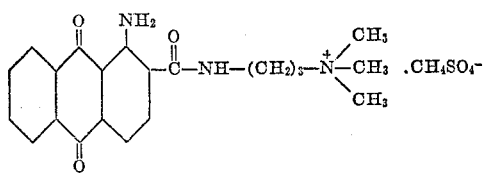

dyed Orlon acrylic fiber from a boiling, weakly acid bath (pH 5) in orange shades of excellent fastness to washing and to light.

EXAMPLE II

A mixture of 50 parts of 1-amino-anthraquinone-2-carbonyl chloride, 100 parts of N-2-aminoethyl-morpholine and 200 parts of water was heated to 95°. After the addition of 40 parts of secondary butyl alcohol, the mixture was boiled under reflux conditions for 16 hours. The resultant mass was cooled to about 30°, filtered and the filter cake after being washed with cold water was dried at about 60°.

The dried base was slurried in about 400 parts of chlorobenzene and 26.6 parts of benzyl chloride were added drop-wise to the agitated slurry. The mixture was agitated for about 16 hours, filtered, washed thoroughly with benzene and dried. The resulting dyestuff, N-benzyl-N-2(1-aminoanthraquinonyl-2-carbonylamino) ethylmorpholinium chloride having the formula

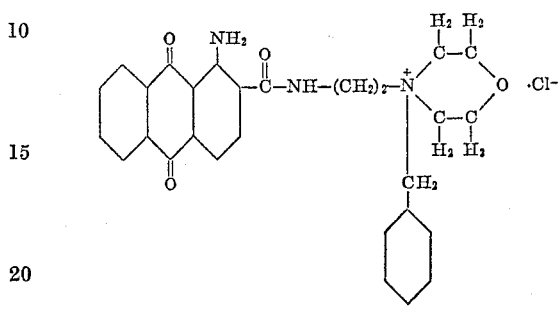

dyed Orlon in orange shades having excellent fastness properties.

EXAMPLES III to VIII, INCLUSIVE

The 1-amino-anthraquinone-2-carbonyl derivatives and alkylene diamines given in Table I below were condensed and quaternized by substantially the same procedure described in Example I above, except that diethyl sulfate was employed as the quaternizing agent in Examples III, V and VIII, and benzyl chloride was employed as the quaternizing agent in Example VI. Dimethyl sulfate, the quaternizing agent used in Example I, was also used in Examples IV and VII.

*Table 1*

| Example | Anthraquinone Derivative | Diamine | Shade Produced by Quaternized Derivative on Orlon |
|---|---|---|---|
| III | 1-amino-anthraquinone-2-COCl | $NH_2-C_2H_4-N(CH_3)_2$ | Red. |
| IV | 1-amino-4-hydroxy-anthraquinone-2-COCl | $NH_2C_2H_4-N(C_2H_5)_2$ | Blue. |
| V | 1-amino-4-(methylamino)-anthraquinone-2-COCl | $NH_2C_3H_6-N(CH_3)_2$ | Blue. |
| VI | 1-amino-4-(phenylamino)-anthraquinone-2-COCl | $NH_2C_3H_6-N(CH_3)_2$ | Blue. |
| | 1-amino-4-(p-tolylamino)-anthraquinone-2-COCl | | |

| Example | Anthraquinone Derivative | Diamine | Shade Produced by Quaternized Derivative on Orlon |
|---|---|---|---|
| VII | 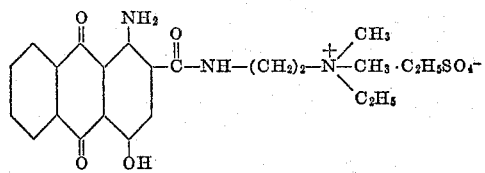 | H₂N—C₂H₄—N(CH₂—C₆H₁₁)₂ | Blue. |
| VIII | 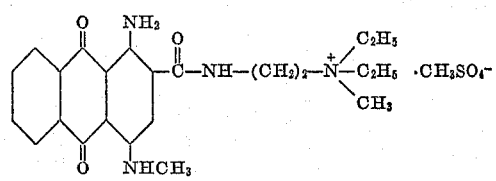 | H₂N—C₂H₄—N(CH₃)(C₆H₁₁) | Blue. |

The cationic anthraquinone dyestuff of Example III has the formula:

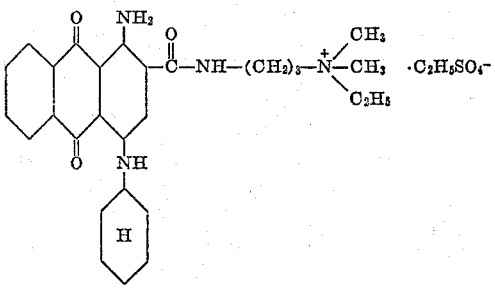

The cationic anthraquinone dyestuff of Example IV has the formula:

The cationic anthraquinone dyestuff of Example V has the formula:

The cationic anthraquinone dyestuff of Example VI has the formula:

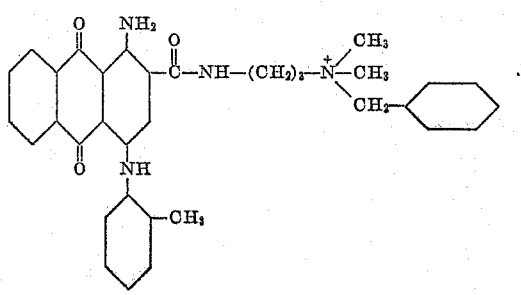

The cationic anthraquinone dyestuff of Example VII has the formula:

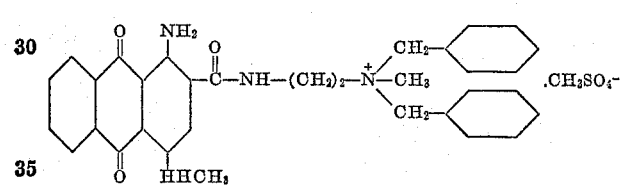

The cationic anthraquinone dyestuff of Example VIII has the formula:

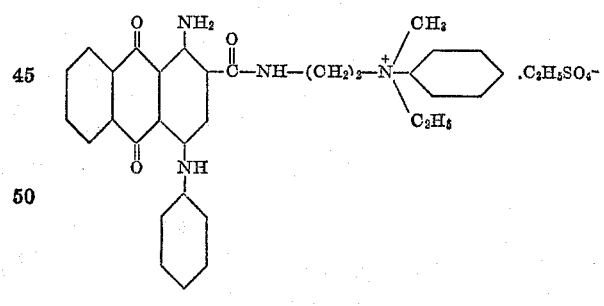

Since certain changes may be made in the above described dyestuffs without departing from the scope of this invention, it is intended that all matter contained in the above description shall be interpreted as illustrative and not in a limiting sense.

What is claimed is:
1. Compounds of the formula:

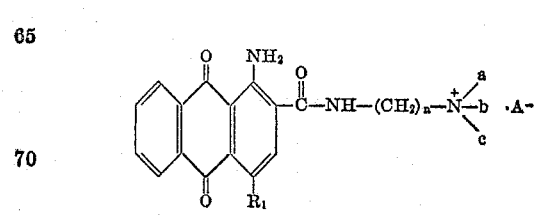

in which $n$ is an integer of from 2 to 4; $a$ is selected from the group consisting of alkyl of from 1 to 4 carbon atoms, benzyl, hydroxyalkyl of from 1 to 4 carbon atoms, phenyl, naphthyl, and $a$, $b$ and the quaternary ammonium nitrogen form a heterocyclic radical selected from the group consisting of morpholino, piperidino, pyrrolidino and piperazino; $b$ is selected from the group consisting of alkyl of from 1 to 4 carbon atoms, benzyl, hydroxyalkyl of from 1 to 4 carbon atoms, phenyl and naphthyl; $c$ is selected from the group consisting of alkyl of from 1 to 4 carbon atoms, benzyl, hydroxyalkyl of from 1 to 4 carbon atoms, phenyl and naphthyl; A is an anion; and $R_1$ is selected from the group consisting of hydrogen, hydroxyl, alkylamino of from 1 to 4 carbon atoms, anilino, naphthylamino, tolyamino, 4-nitrophenylamino, methylcyclopentylamino, cyclohexylamino, methylcyclohexylamino and cyclopentylamino.

2. The compound of the formula:

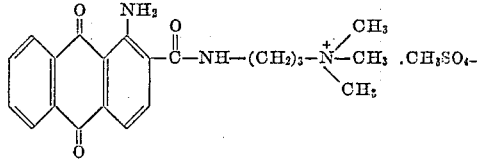

References Cited in the file of this patent
UNITED STATES PATENTS

| | | |
|---|---|---|
| 1,871,821 | Nawiasky et al. | Aug. 16, 1932 |
| 2,924,609 | Joyce | Feb. 9, 1960 |